Patented Nov. 24, 1936

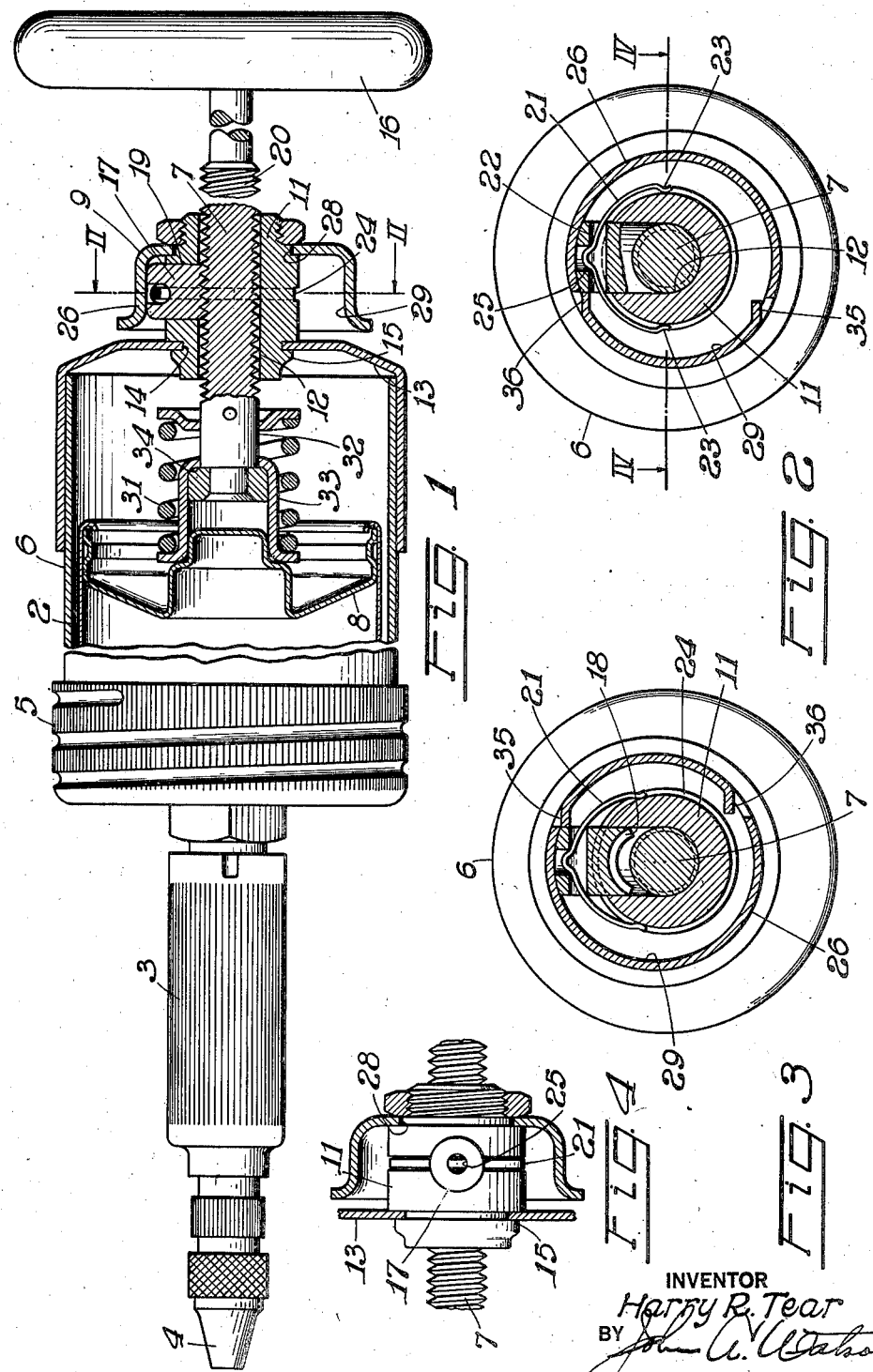

2,061,743

UNITED STATES PATENT OFFICE 2,061,743

LUBRICATING DEVICE

Harry R. Tear, Evanston, Ill., assignor to The Lubrication Corporation, South Bend, Ind., a corporation of Delaware Application November 19, 1934, Serial No. 753,663

4 Claims. (Cl. 74—424.8)

This invention relates to improvements in lubricating devices and more particularly to lubricating guns of the type wherein a feed screw, ratchet mechanism or the like may be employed to urge a piston against a body of lubricant comprising a lubricant supply source for the gun, thereby to expel lubricant from the said supply source. A feed screw mechanism has been chosen for illustration of the invention herein.

The use of hand screws for applying thrust to the piston of the lubricant reservoir of a hand gun or lubricant dispenser has become a common expedient in the art of lubricating devices because of the high force-multiplying ratio inherent in so-called "feed screws". One of the disadvantages attributable to prior art lubricating devices incorporating "feed screws" is that in order to refill the reservoir or lubricant container, it has been necessary to turn the screw in a reverse direction until the screw had moved rearwardly along its axis an amount sufficient to permit the withdrawal of the piston so that the reservoir or container could be refilled or replaced. This problem has become increasingly important in connection with lubricating guns having interchangeable lubricant cartridges of the character illustrated herein for a source of lubricant supply since the feed screw for the cartridge piston may have to be withdrawn when it becomes necessary to change the cartridge whether the contents of the cartridge has been exhausted or not. In using interchangeable cartridges, for instance, one may desire to remove a partially empty cartridge and replace the same by another partially empty or a full cartridge, in which case the feed screw may have to be adjusted a considerable amount.

I am aware that various types of so-called "quick-release" mechanisms have been proposed from time to time for the feed screws of low pressure grease guns, but such mechanisms have been relatively complicated in structure and when installed occupy an unreasonable amount of space within the lubricant containing barrel of the gun.

An object of my invention, therefore, is to provide, in a lubricant gun having a feed screw, or the like, an improved and simplified mechanism whereby the feed screw may be readily disengaged to permit its free longitudinal movement without rotation, thereby to facilitate quick engagement with and disengagement from a cartridge piston or the like, and whereby the feed screw may be readily re-engaged to restore its normal operating condition wherein longitudinal movement may be accomplished only by rotation.

Another object is to provide, in a lubricating device, a novel quick release mechanism for the piston feed screw in which mechanism there are relatively few parts, a mechanism that is durable, and one that is easy to operate.

Other objects, the advantages, and uses of the invention and various species thereof should become apparent after reading the following description and claims and after viewing the drawing in which:

Fig. 1 is a broken side elevation partly in section of a hand lubricating gun incorporating the features of my invention;

Fig. 2 is a sectional view along the line II—II of Fig. 1;

Fig. 3 is a view similar to Fig. 2 illustrating the clutch mechanism in "released" position; and Fig. 4 is a sectional view along the line IV—IV of Fig. 2.

I have selected for illustration herein a cartridge type hand lubricating gun employing an interchangeable lubricant supply cartridge 2 as a source of lubricant supply therefor. The gun may comprise a high pressure lubricant pump 3 having a discharge nozzle 4, a screw cap 5 fixed relatively to the pump 3 and adapted to support a cartridge-confining barrel 6 by threaded engagement therewith, a hand operated feed screw 7 for applying thrust to the piston 8 of the cartridge 2 and a clutch mechanism 9 supported upon the barrel 6 for rendering the screw 7 operative or inoperative at will to urge the piston 8 against the lubricant contents of the cartridge as the screw is turned.

The mechanism for supporting the cartridge 6 upon the pump 3 and for establishing communication between cartridge and pump may be constructed after the manner illustrated and described in my copending application Serial No. 743,123, filed September 17, 1934. The pump 3 may be of the conventional high pressure "push" type having a piston and cylinder of relatively small bore.

The clutch mechanism 9 may comprise a rigid member 11 having a bore 12 extending longitudinally therethrough and fixed at one end thereof in the end wall 13 of the barrel 6 by the disposition of the member through an opening 14 centrally located in the end wall of the barrel as shown. The member 11 may be swaged in place upon the barrel as indicated at 15 with the axis of the bore 12 lying along the axis of the barrel 6 and cartridge 2. The diameter of the bore 12 is slightly greater than the diameter of the screw 7 thereby to permit manual movement of the screw longitudinally of the barrel 6, as by manipulation of a hand grip 16 mounted at the rearward end of the screw.

A clutch member 17 having screw threads 18 at the inner end thereof is slidably mounted in a bore 19 extending through the side wall of the member 11 and perpendicularly to the axis of the bore 12, in that portion of the member 11 located exteriorly of the barrel 6. The screw threads 18 are complementary to the threads 20 of the hand screw 7 so that when the clutch 17 is in the position indicated in Figs. 1 and 2, rotation of the screw 7 will cause the screw to move along its longitudinal axis.

A band spring 21 extending through a bore 22 through the outer end of the clutch 17 and bearing at its outer ends 23 upon the member 11 may be employed normally to urge the clutch 17 outwardly of the bore 19 and therefore out of engagement of the threads 20 with the hand screw 7. The ends 23 of the spring 21 may be located within a circumferential groove 24 formed in the side wall of the member 11 to retain the spring against lateral displacement with respect thereto and to prevent rotation of the clutch 17, thereby to maintain the threads 18 in proper alignment for engagement with the threads 20. The midportion of the spring 21 may be formed with a hump at its midpoint adapted to extend into a short bore 25, extending through the outer end of the clutch member and into the bore 22, thereby to retain the spring against displacement relative to the clutch member. Operating means for the clutch may comprise a cup-shaped cam 26 mounted for rotation upon the member 11 by means of an eccentrically located opening 28 through the central wall of the cam whereby rotation of the cam 26 from the position shown in Fig. 2 to the position shown in Fig. 3 will cause the clutch member 17 to move out of engagement with the threads of the screw 7 and vice versa, the inner wall 29 of the cam 26 providing a cam surface engageable at all times with the end wall of the clutch member.

If desired, a compression spring 31 may be located between the forward end 32 of the screw 7 and the piston-engaging member 33 of the hand screw assembly, a lost motion connection between the feed screw and the cup-shaped member 33 being provided as indicated at 34. This simple arrangement permits the operator to place the cartridge piston 8 under a load represented by the compression of the spring 31 and eliminates the necessity of turning the hand screw each time it is necessary to apply pressure to lubricant within the cartridge during short periods of continued operation of the gun.

In operation the hand screw may be rotated by manual engagement with the hand grip 16 to advance the piston 8 precisely in the same manner as conventional hand feed screws have been operated in prior art devices. When it is desired, however, to disengage the screw 7 from the cartridge piston and to move the screw into a position necessary to lie clear of the cartridge and in readiness for engagement with the piston of a fresh cartridge, the operator may withdraw the screw 7 by the simple operation of turning the cam member 26 to the position shown in Fig. 3 and drawing rearwardly upon the hand-grip 16.

The screw feed mechanism may be restored to operative position by rotating the cam 26 to the position shown in Fig. 2. In order that the operator may not move the cam 26 beyond its proper limits of rotational movement, stop lugs 35 and 36 may be formed on the cam 26 for engagement with the clutch member 17 as indicated in Figs. 2 and 3 respectively.

It is to be understood that the above described embodiments of the invention are presented for the purpose of illustration only, and various changes may be made therein without departing from the spirit and scope of the invention.

I claim:

1. In a lubricating device, a quick release feed screw mechanism comprising, a relatively stationary member, a feed screw slidably mounted on said member whereby the screw may be moved longitudinally without rotation, a screw-engaging member having screw threads thereon complementary to the threads of said feed screw, said screw-engaging member being mounted on said relatively stationary member for movement into and out of engagement with said feed screw, a spring secured to said screw-engaging member and contacting said stationary member for urging said screw-engaging member away from said feed screw and for preventing rotation of said screw-engaging member relative to said stationary member, and a cam rotatably mounted on said stationary member and engageable with said screw-engaging member for urging said screw-engaging member toward said feed screw against the force of said spring upon rotation of said cam in one direction.

2. In a lubricating device including a barrel, a quick release feed screw mechanism comprising, a member rigidly secured to said barrel and located outside thereof, a feed screw extending through said member and freely movable therein, a screw-engaging member movably carried by said first named member and movable into and out of engagement with the feed screw, and a cylindrical cup-shaped cam rotatably secured to said first named member on an axis eccentric of the axis of the feed screw and engaging said screw-engaging member to move it into engagement with the feed screw.

3. In a lubricating device including a barrel, a quick release feed screw mechanism comprising a member of smaller diameter than the barrel and fixed to the outside of one end of the barrel, a feed screw extending through said member, a screw-engaging member carried by said fixed member and movable into and out of engagement with the feed screw, and a cylindrical cup-shaped cam member of smaller diameter than the barrel rotatably secured to said fixed member on an axis eccentric of the axis of the feed screw and overlying the screw engaging member to move the latter into engagement with the feed screw.

4. In a quick release feed screw mechanism for a lubricating device, a fixed member to receive a feed screw and having a peripheral groove therein, a cylindrical screw-engaging member carried by said fixed member, and a spring secured at its central portion to said screw-engaging member with its ends engaging said peripheral groove to urge the screw-engaging member away from the fixed member and to hold the screw-engaging member against rotation.

HARRY R. TEAR.